R. D. TURNER.
PROCESS AND APPARATUS FOR CLEANING AND PURIFYING OIL, GREASE, &c.

No. 194,275. Patented Aug. 14, 1877.

UNITED STATES PATENT OFFICE.

REUBEN D. TURNER, OF PHILADELPHIA, PENNSYLVANIA.

IMPROVEMENT IN PROCESSES AND APPARATUS FOR CLEANING AND PURIFYING OIL, GREASE, &c.

Specification forming part of Letters Patent No. 194,275, dated August 14, 1877; application filed December 22, 1876.

*To all whom it may concern:*

Be it known that I, REUBEN D. TURNER, of Philadelphia, in the county of Philadelphia and State of Pennsylvania, have invented a certain new and useful Process and Apparatus for Cleaning and Purifying Oil, Grease, &c.; and I do hereby declare the following to be a full, clear, and exact description of the invention, such as will enable others skilled in the art to which it pertains to make and use it, reference being had to the accompanying drawings, which form part of this specification, in which—

Figure 1:
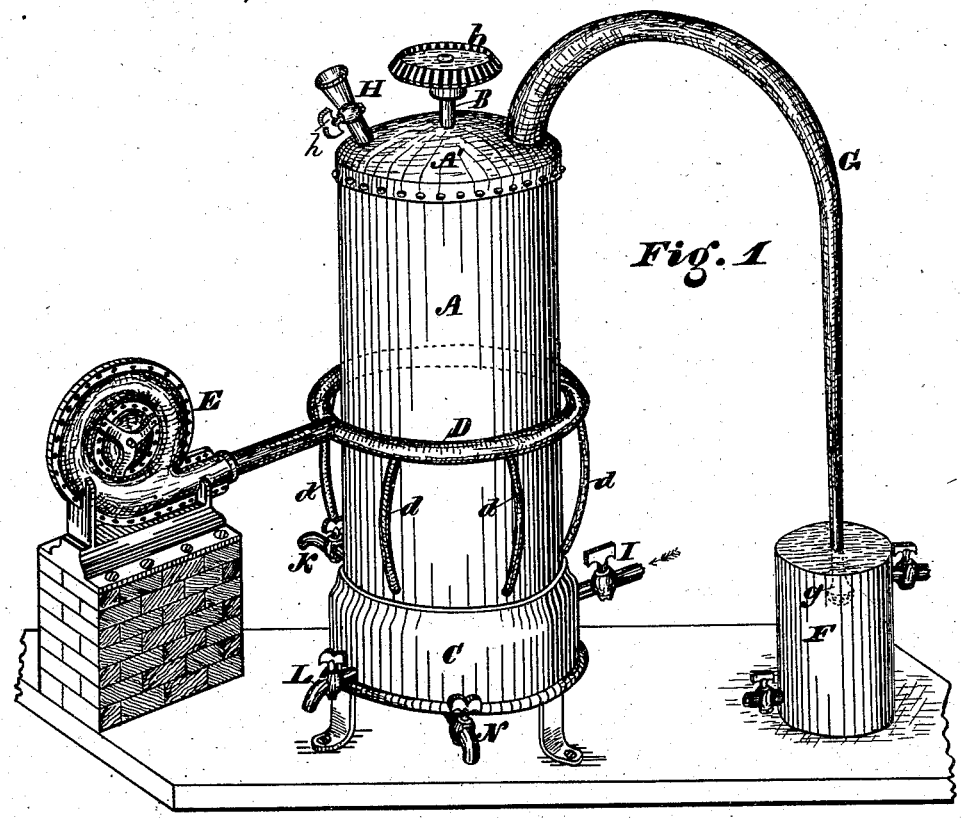
Figure 2:
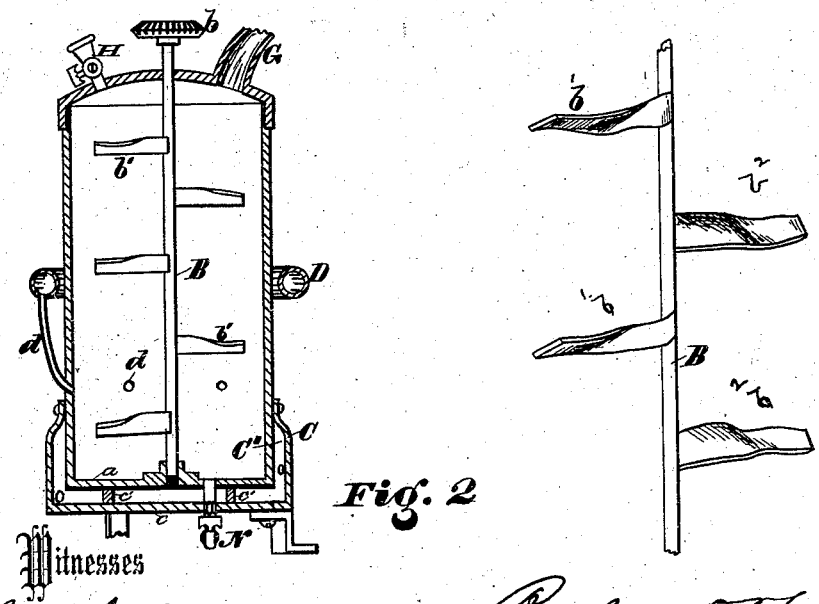
Figure 3:
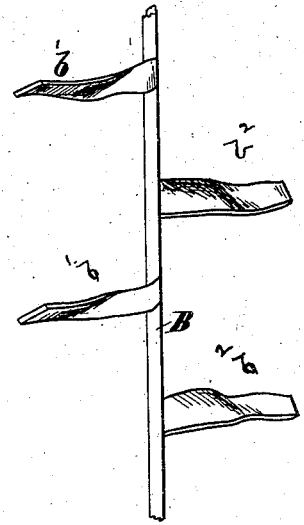

Figure 1 is a perspective of my invention. Fig. 2 is a broken vertical section. Fig. 3 is a detail view of beaters.

The object of my invention is to refine, purify, and deodorize oil, grease, and fatty matters without the employment of chemical agents, so called.

My improvements consist in a novel process for effecting the object stated, and in peculiarly-constructed apparatus for operating said process.

My improved process consists, essentially, in subjecting the oil or other matter to be cleansed to violent agitation while mixed or commingled with water, a current or currents of air being blown constantly through the mixture while in a state of agitation, and heat being applied during a part of the operation, as hereinafter set forth.

The peculiar apparatus by which I carry said process into effect comprises the following parts or instrumentalities: First, a close vessel for containing the mingled oil, grease, or fatty matter and water, said vessel being furnished with a steam or water jacket, and with a vertical rotating shaft armed with radial beaters; second, an annular pipe connected with a bellows or other apparatus for forcing air, and communicating by branches with the liquid-tank; third, a condenser communicating with the upper part of the liquid-tank by a pipe, which conveys the air and gaseous exhalations from the latter to the former.

I shall first describe the construction of the apparatus, and shall then explain the process as practiced therewith.

Referring to the accompanying drawings,

A designates an upright close vessel of cylindrical form, having a dome or top, $A'$. B is a vertical shaft sustained in suitable bearings in said vessel, and having on its upper end a cog-wheel or pulley, $b$, by means of which it may be rotated. Said shaft is armed with radial beaters $b^1$ $b^2$, twisted spirally in such manner that the upper beaters will have a tendency to beat down liquid held in the vessel A and agitated by them, while the lower beaters will have a reverse tendency—namely to elevate such liquid.

C is a steam or hot-water jacket surrounding the lower part of the vessel A, its bottom $c$ extending beneath the bottom $a$ of said vessel, and forming a chamber, $C'$.

Supports for sustaining the bottom $a$ are shown at $c'$, said supports not, however, interfering with the free circulation of steam or hot water throughout the chamber $C'$, said chamber extending not only around the sides of the vessel A, but beneath its bottom.

D is an annular pipe, encircling the vessel A, and communicating with the interior of the latter by branches $d$ $d$, so as to convey a current or currents of air under pressure from a bellows or a blower, E, into said vessel.

I have represented said pipe as passing around the vessel A at or about the middle of the latter. In practice, however, I prefer to locate such pipe somewhat higher up, so as to prevent the liquid contents of the vessel A from rising to it through the branches $d$.

F represents a condenser, communicating with the vessel A by means of a tapering pipe, G, which should terminate in a rose, $g$, or equivalent distributer.

H is an inlet for the admission of water and the oil, or other substance to be cleansed, to the vessel A; and I, a valved pipe for introducing steam or hot water to the chamber $C'$.

K is a cock for drawing off the oil or purified substance, and N is another cock, through which the water and residuum are withdrawn from the vessel A. The chamber $C'$ is emptied of its contents through the cock L.

The operation is substantially as follows: If lard, grease, or other like solid matter, is to be cleansed or refined, it is first reduced by melting to about the liquid consistency of oil, its subsequent treatment being the same as that of the latter, which I shall now proceed to describe.

I take about equal parts, by measurement, of oil and water, and sufficient in quantity to fill the vessel A, into which they are introduced to about three-fourths its depth. The bellows or blower is started previous to putting the oil and water in the vessel A, so as to prevent said liquids from rising, as already described, to the pipe D, and is kept constantly going through the remainder of the treatment, so as to force a continuous current or currents of air through the liquid mass. As soon as the liquids are introduced into the vessel A, and the valve h in the inlet-pipe H closed, steam or hot water is admitted to the chamber C'. Simultaneously therewith the shaft B is rapidly rotated, producing a violent agitation of the liquid contents of the vessel A.

After the process or operation has proceeded for some time—say, ordinarily, about an hour and a half, during which time the heat within the chamber C' must be kept up to about 212° Fahrenheit, so as to maintain the contents of the vessel A at as high a temperature as possible, but yet below the boiling-point—the agitation is suspended to permit the heated water to settle and be drawn off through the cock N. Cold water is then introduced to supply the place of the heated water, and the agitation and injection of the air continued until the process is completed, which will usually occupy an hour to an hour and a half longer, during which time the steam or hot water will be shut off from the chamber C'.

The object of the change from the hot to the cold treatment before the completion of the process is to effect a more thorough bleaching of the substance treated. If such substance be lard or other matter which will harden or congeal quickly, the change must be gradual, so as to permit the impurities to settle before such hardening or congelation takes place.

The effect of the agitation described is, that the oil and water are broken into atoms or molecules, which impinge upon one another violently, thus securing a thorough washing and cleansing of the oil or other substance treated. At the same time the currents of air forced into and through the liquid mass mingle with and embrace the atoms of oil and water, and serve to aid the agitation of the same. The air-currents, which find their way out of the liquid-vessel through the pipe G, go laden with gaseous exhalations and a portion of the odoriferous elements of the oil, and deposit the same in the condenser, where said gaseous matter is condensed and saved from loss.

After the agitation and other treatment has been continued for a sufficient length of time to complete the cleansing and deodorization of the oil or other matter treated, which time will vary according to the condition or quality of the oil, and will be influenced by the state of the atmosphere, and which, therefore, must be determined by the skill and judgment of the operator, the process is suspended and the liquid contents of the vessel A allowed to settle and separate.

If desired, the settling and separation may be allowed to proceed in the vessel A; but in order to use said vessel continuously during working hours, it is judicious to draw off the liquids immediately after agitation has ceased, and permit the settling to take place in separate vessels. When thus allowed to settle, the purified oil or other substance treated rises to the top, while the water, which is then intensely odorous and found to hold impure matter in suspension or solution, sinks to the bottom. The main portion of the impurities is found floating on the surface of the water and beneath the oil.

If the settling has been permitted to take place in the vessel A, the purified substance may be drawn off through the cock K, while the water and impurities will find their exit through the cock N, which is, subsequently to the withdrawal of such purified substance, opened for that purpose.

In the production or treatment of illuminating-oils by this process, I take the distillate, or other products lighter than the distillate, and subject the same to the treatment stated.

In treating and producing lubricating-oils from petroleum, I use either the crude article or its products by distillation.

By this process, also, the cheaper or inferior oils may be purified and brought to any required gravity or flashing point.

The process described is applicable to vegetable, fish, and animal oils, as well as to petroleum or other mineral oil. In every case the result of the process is to free the material treated from all of its impurities or admixtures and disagreeable odors.

I have suggested equal parts of water and oil (or other matter treated) to be mingled, as I deem this proportion the best for the purpose in view; but I do not limit myself thereto, as the quantity of water may be increased to three-fourths or decreased to one-fourth of the whole liquid mass, and very beneficial results be still obtained.

The degree of agitation should be sufficiently violent to break up the liquid mass into the smallest possible parts or atoms.

The air should be admitted under strong pressure—say fifty pounds to the square inch—and should be as large in volume as can be conveniently provided, care being taken that neither the volume nor pressure thereof shall be great enough to throw the liquid contents of the tank A against the top A', or to force the same in a liquid form through the pipe G. Observing this caution, the volume of air cannot be too large, for the larger it is the sooner will the treatment be accomplished. If the volume or pressure of air be slight the process will be correspondingly prolonged.

Now, I do not wish to be understood as claiming, broadly, a process for cleaning and purifying oil in which acid treatment is dispensed with, or a process consisting in the employment of water and air, and the agitation of the oil while undergoing the water-and-air treatment without acid. I am aware that such processes have been patented and probably used.

One of said processes consists in heating the oil to a high temperature, agitating it at such temperature, and injecting dry air or steam over the surface of the oil.

The difference between this process and mine is, that I employ heat during a part only of the operation, and instead of injecting dry air or steam over the oil, I mix water with the oil, and inject the air into and through the mixture.

A second process, from which mine differs, consists in heating and agitating the oil, and injecting into it currents of hot air, and over it jets of steam. While in this process the agitation and injection of air are employed, the commingling of the oil with water is not one of the steps of the process. In my process this is essential.

A third process involves the use of an acid, which forms part of the mixture to be agitated by currents of air. Afterward the oil is washed with hot water.

My process dispenses with the acid, the commingling in the first instance with water, and the violent agitation of the mass while currents of air are passing through, being substituted. The agitation serves to break the mixture into atoms, which are taken up by the air-currents and thrown about in contact therewith, with the effect of thoroughly cleansing and purifying the oil.

What I claim as my invention is—

1. The process herein described for refining, purifying, and deodorizing oil, grease, or fatty matter by mingling the same with water, and violently agitating the liquid mass in a close vessel, a current or currents of air being forced into and through the liquids at the same time, and heat being applied during the first part of the operation, substantially as described.

2. The vessel A, having a beater-shaft, B, and steam or hot-water chamber C', in combination with the air-pipe D, encircling the vessel A, and provided with branches $d$, substantially as shown and described.

In testimony that I claim the foregoing I have hereunto set my hand this 19th day of December, 1876.

REUBEN D. TURNER.

Witnesses:
SAMUEL J. VAN STAVOREN,
CHAS. F. VAN HORN.